(12) United States Patent
Wang et al.

(10) Patent No.: US 8,369,902 B2
(45) Date of Patent: Feb. 5, 2013

(54) COMBINED APPARATUS OF BLUETOOTH EARSET AND CHARGING DOCK

(75) Inventors: Yuhua Wang, Beijing (CN); Lun Chai, Hong Kong (CN)

(73) Assignee: Winplus Company Limited, Hong Kong (CN)

( * ) Notice: Subject to any disclaimer, the term of this patent is extended or adjusted under 35 U.S.C. 154(b) by 492 days.

(21) Appl. No.: 12/599,207

(22) PCT Filed: May 16, 2008

(86) PCT No.: PCT/CN2008/000960
§ 371 (c)(1),
(2), (4) Date: Mar. 3, 2010

(87) PCT Pub. No.: WO2008/145006
PCT Pub. Date: Dec. 4, 2008

(65) Prior Publication Data
US 2010/0210314 A1 Aug. 19, 2010

(30) Foreign Application Priority Data

| May 25, 2007 | (CN) | 2007 2 0153817 U |
| Sep. 25, 2007 | (CN) | 2007 2 0175653 U |
| Jan. 23, 2008 | (CN) | 2008 2 0004512 U |

(51) Int. Cl.
*H04M 1/00* (2006.01)
*H04B 7/00* (2006.01)

(52) U.S. Cl. .................................. 455/569.1; 455/41.2
(58) Field of Classification Search ...................... None
See application file for complete search history.

(56) References Cited

U.S. PATENT DOCUMENTS

| 7,292,823 B2* | 11/2007 | Kuo | 455/41.2 |
| 2006/0019718 A1 | 1/2006 | Kuo | |
| 2006/0202702 A1* | 9/2006 | Ham et al. | 324/537 |
| 2007/0093279 A1* | 4/2007 | Janik | 455/569.1 |
| 2008/0132168 A1* | 6/2008 | Segev et al. | 455/41.2 |

FOREIGN PATENT DOCUMENTS

| CN | 2631171 Y | 8/2004 |
| CN | 2634592 Y | 8/2004 |
| CN | 2646960 Y | 10/2004 |
| CN | 201039441 Y | 3/2008 |

* cited by examiner

Primary Examiner — Erika A Washington
(74) Attorney, Agent, or Firm — The Webb Law Firm

(57) ABSTRACT

The present invention discloses a combined apparatus of a Bluetooth earset and a charging dock, characterized in that the combined apparatus comprises the Bluetooth earset and the charging dock which can be connected to a power supply, said charging dock comprising a main body portion, and one end of the charging dock is an electrical connection portion which is connected to a DC power supply, and the other end of the charging dock is a holding cavity portion for fixing the Bluetooth earset, and electric contacts in the holding cavity portion are adapted to electric contacts on a bottom end of the Bluetooth earset.

17 Claims, 14 Drawing Sheets

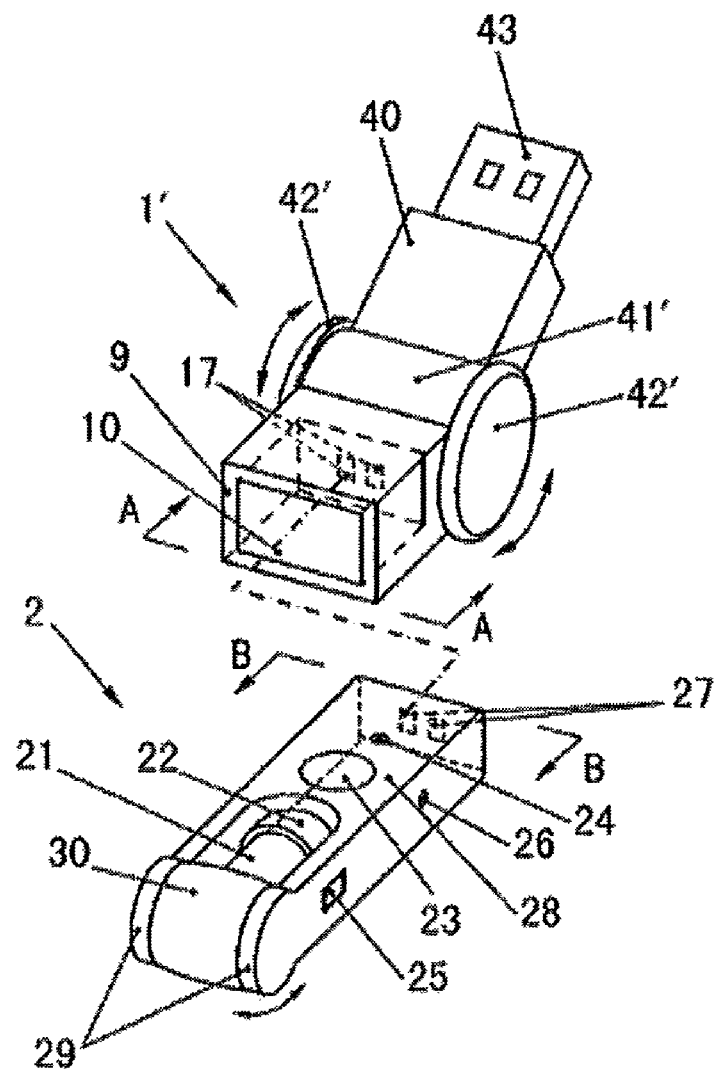
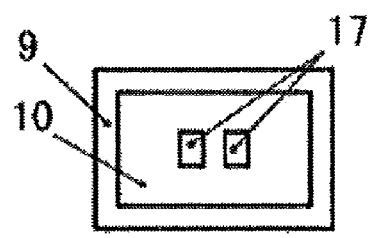 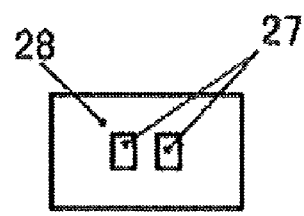
FIG. 2A
FIG. 2B　　　FIG. 2C

A'-A' View

B'-B' View

C-C View

A'-A' View

B'-B' View

C-C View

COMBINED APPARATUS OF BLUETOOTH EARSET AND CHARGING DOCK

FIELD OF THE INVENTION

The present invention relates to a combined apparatus of a Bluetooth earset and a device for charging and fixing the Bluetooth earset.

BACKGROUND OF THE INVENTION

Among the conventional wireless earsets which are used cooperatively with a mobile phone, there is an earset with a trade name of Bluetooth earset. In use, an earphone portion is inserted into a user's ears, and the earset is hung outside ears without being manually supported. In the case where the earset is used in an automobile, in order to ensure safety, a user can drive the automobile with two hands while using a mobile phone placed in the automobile. However, if the Bluetooth earset is to be charged, a device for charging the Bluetooth earset is required to be provided in the automobile. Also, when the earset is not used, it is required to put and fix the earset in a handy and convenient position in the automobile. Therefore, it is necessary to make an improved design.

SUMMARY OF THE INVENTION

An object of the present invention is to provide a combined apparatus of a Bluetooth earset and a charging dock which can overcome the demerits of the prior art and in which the combined apparatus comprises the Bluetooth earset and the charging dock which can be connected to a power supply, the charging dock comprising a main body portion, an electrical connection portion which can be connected to a DC power supply is formed at one end of the charging dock, and a holding cavity portion for fixing the Bluetooth earset is formed at the other end of the charging dock, electric contacts are provided in the holding cavity portion for being adapted to electric contacts at a bottom end of the Bluetooth earset.

In the combined apparatus according to the invention, the electrical connection portion and the holding cavity portion of the charging dock are directly connected into an integral unit.

In the combined apparatus according to the invention, an angularly rotatable device is provided between the electrical connection portion and the holding cavity portion.

In the combined apparatus according to the invention, the electrical connection portion is an electric plug which can be connected to an automobile's 12V or 24V DC electric socket, and a converting device which converts a 12V or 24V DC power supply into a power supply suitable for charging the Bluetooth earset is provided in the electric plug.

In the combined apparatus according to the invention, the electrical connection portion is a standard type USB male port.

In the combined apparatus according to the invention, the Bluetooth earset includes an earphone which includes an earphone neck and an earphone head, a rotating cylinder is provided at an end of the Bluetooth earset where the earphone is disposed for causing the earphone neck and the earphone head to be rotated so that their axis is in the same direction with an axis of the main body portion of the Bluetooth earset.

In the combined apparatus according to the invention, the Bluetooth earset includes an earphone which includes an earphone neck and an earphone head, the earphone neck and the earphone head are fixed with respect to the main body portion of the Bluetooth earset, and an axis of the earphone neck and the earphone head forms an angle of 60°~90° with respect to the main body portion of the Bluetooth earset.

In the combined apparatus according to the invention, the electric contacts at the bottom end of the Bluetooth earset are a mini USB female port.

In the combined apparatus according to the invention, an upper wall of the holding cavity portion of the charging dock is inclined upward with an elevation angle within a range of 10°~60°.

In the combined apparatus according to the invention, a base plate of the holding cavity portion of the charging dock is in a shape of a shallow channel and extends outward, and the base plate has short side-edges and a holding hole and an end opening for receiving and fixing the earphone neck are formed on an outer end of the base plate.

In the combined apparatus according to the invention, an axis of the electrical connection portion and an axis of the holding cavity portion form a fixed angle within a range of 90°~180°

In the combined apparatus according to the invention, an upper wall of the holding cavity portion of the charging dock is substantially parallel to a base plate of the holding cavity portion.

In the combined apparatus according to the invention, a USB data storage which can be in communication with a computer is further provided in the main body portion of the charging dock, and a supporting rack which can be pulled out or pushed back is provided under the main body portion of the charging dock.

In the combined apparatus according to the invention, a window in which an inner core is fitted is formed on a lower end of the main body portion of the charging dock, and the inner core can be rotated around a rotating axis perpendicular to a longitudinal axis of the charging dock.

In the combined apparatus according to the invention, the electrical connection portion is connected to the inner core and protrudes outside the window.

In the combined apparatus according to the invention, two discontinuous surfaces which are perpendicular to the longitudinal axis of the main body portion are provided in the lower end portion of the main body portion of the charging dock, a rotating axle is provided on one of the discontinuous surfaces, and an axle-bearing cavity which cooperates with the rotating axle is provided on the other of the discontinuous surfaces, and the two discontinuous surfaces are kept contact with each other and can be rotated with respect to each other up to an angle of 90°.

In the combined apparatus according to the invention, a position limiting mechanism is provided in the lower end portion of the main body portion of the charging dock.

In the combined apparatus according to the invention, the electrical connection portion is connected to a lower end of the main body portion of the charging dock through a piece of corrugated flexible tube which is flexible and has a certain rigidity.

In the combined apparatus according to the invention, the electric contacts in the holding cavity portion are a mini USB male port which is exactly fitted with the mini USB female port of the Bluetooth earset.

In the combined apparatus according to the invention, a plugging-in hole which can be connected to a power supply obtained by transforming and rectifying a 100V~240V AC power supply is provided on the Bluetooth earset, and a plugging-in hole which can be connected to an external stereo earphone is further provided on the Bluetooth earset.

According to the combined apparatus of the Bluetooth earset and the charging dock, when the Bluetooth earset is to be charged, the device for charging the earset is provided in the automobile; when the earset is not used, it can be put and fixed in a handy and convenient position in the automobile. Further, the combined apparatus is simple in structure and convenient in use.

BRIEF DESCRIPTION OF THE DRAWINGS

FIGS. 1A to 1C are schematic diagrams showing a first embodiment of a combined apparatus of a Bluetooth earset and a charging dock of the invention, wherein, FIG. 1A is an exploded 3D diagram of the combined apparatus, FIG. 1B is an A-A direction view of a holding cavity in FIG. 1A, and FIG. 1C is a B-B direction view of a bottom end of the Bluetooth earset in FIG. 1A.

FIGS. 2A to 2C are schematic diagrams showing a second embodiment of the combined apparatus of the Bluetooth earset and the charging dock of the invention, wherein, FIGS. 2B and 2C are similar to FIGS. 1B and 1C respectively.

FIGS. 3A to 3D are schematic diagrams showing a third embodiment of the combined apparatus of the Bluetooth earset and the charging dock of the invention, wherein, FIG. 3B is an A'-A' direction view of a holding cavity in FIG. 3A, FIG. 3C is a B'-B' direction view of a bottom end of the Bluetooth earset in FIG. 3A, and FIG. 3D is a C-C direction view of the Bluetooth earset in FIG. 3A.

FIGS. 4A to 4D are schematic diagrams showing a fourth embodiment of the combined apparatus of the Bluetooth earset and the charging dock of the invention, wherein, FIGS. 4B to 4D are similar to FIGS. 3B to 3D respectively.

FIGS. 5A and 5B are schematic diagrams showing use modes of the combined apparatus of the Bluetooth earset and the charging dock of the third embodiment of the invention, wherein, FIG. 5A is a schematic diagram showing a first use mode, and FIG. 5B is a schematic diagram showing a second use mode.

FIGS. 6A and 6B are schematic diagrams showing a fifth embodiment of the combined apparatus of the Bluetooth earset and the charging dock of the invention and use modes thereof, wherein, FIG. 6A shows the combined apparatus and a first use mode thereof, and FIG. 6B shows the combined apparatus and a second use mode thereof.

FIGS. 7A and 7B are schematic diagrams showing a charging dock of the combined apparatus of the Bluetooth earset and the charging dock of a seventh embodiment of the invention, wherein, FIG. 7A is a top view of the charging dock, and FIG. 7B is a front view of the charging dock.

FIGS. 8A and 8B are schematic diagrams showing the Bluetooth earset of the combined apparatus of the Bluetooth earset and the charging dock of the seventh embodiment of the invention, wherein, FIG. 8A is a top view of the Bluetooth earset, and FIG. 8B is a front view of the Bluetooth earset.

FIGS. 10A and 10B are schematic diagrams showing the charging dock of the combined apparatus of the Bluetooth earset and the charging dock of an eighth embodiment of the invention, wherein, FIG. 10A is a top view of the charging dock, and FIG. 10B is a front view of the charging dock.

FIGS. 11A and 11B are schematic diagrams showing that the Bluetooth earset is fixed on the charging dock in the eighth embodiment of the combined apparatus of the Bluetooth earset and the charging dock of the invention, wherein, FIG. 11A shows a first step of the fixing procedure, and FIG. 11B shows a second step of the fixing procedure.

FIGS. 12A to 12C are schematic diagrams showing a ninth embodiment of the combined apparatus of the Bluetooth earset and the charging dock of the present invention, wherein, FIG. 12A is an exploded 3D diagram of the combined apparatus, FIG. 12B is an A-A section view of a holding cavity in FIG. 12A, and FIG. 12C is a B-B section view of a bottom end of the Bluetooth earset in FIG. 12A.

FIGS. 14A and 14B are schematic diagrams showing the charging dock of the combined apparatus of the Bluetooth earset and the charging dock according to an eleventh embodiment of the present invention, wherein, FIG. 14A is a 3D diagram of the charging dock, and FIG. 14B is a C-C direction view of a bottom end of the charging dock.

DETAILED DESCRIPTION OF THE PREFERRED EMBODIMENTS

Exemplary embodiments of the invention will be described in detail below with reference to the accompanying drawings.

Figure 1A:
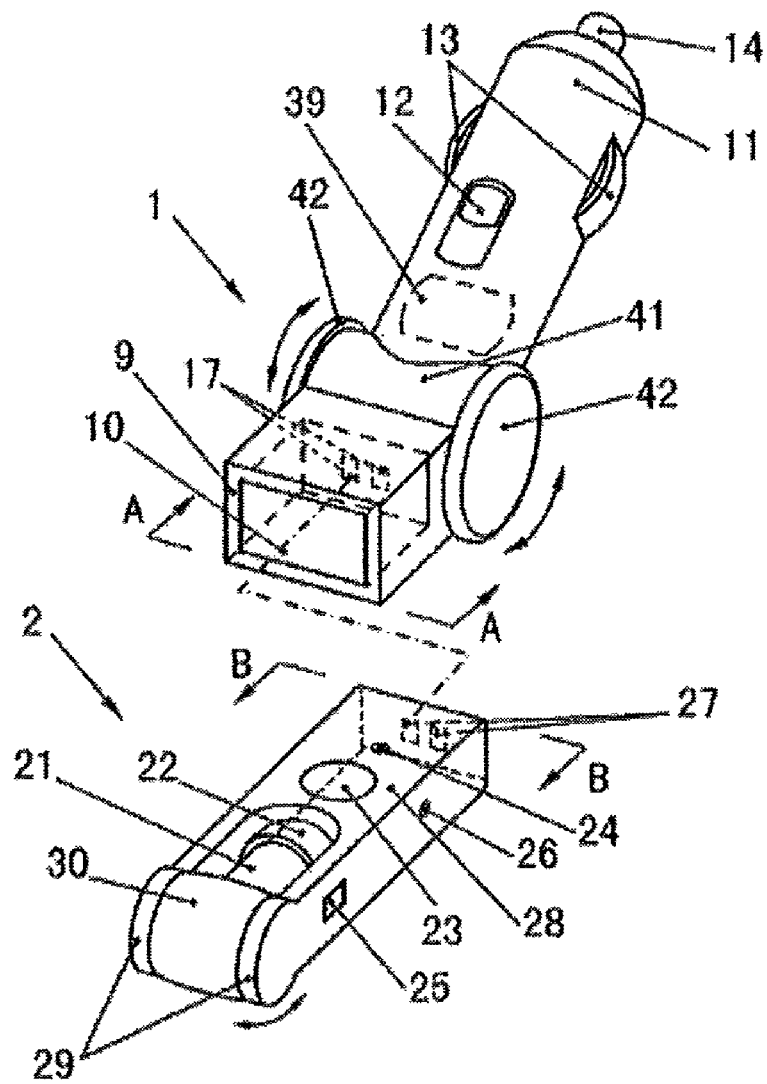
Figure 1B:
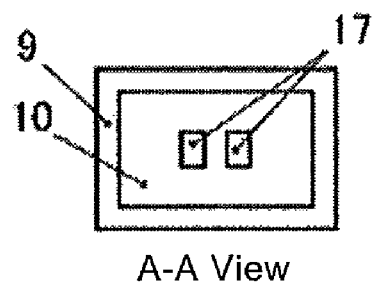
Figure 1C:
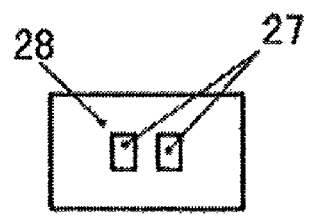

FIGS. 1A to 1C show a first embodiment of a combined apparatus of a Bluetooth earset and a charging dock of the invention. In FIG. 1A, a reference numeral 1 denotes the charging dock, a reference numeral 2 denotes the Bluetooth earset which is used cooperatively with the charging dock. An electric plug 11 which can be inserted into a 12V or 24V DC electric socket in an automobile is provided at one end of the charging dock 1. A positive pole 14, negative poles 13, an electric switch 12 and a built-in converting device 39 are provided on the electric plug 11, and the converting device 39 is used to convert a 12V or 24V DC power supply into a power supply suitable for charging the Bluetooth earset. A holding cavity 10 for inserting and holding a lower end of the Bluetooth earset 2 is provided on the other end of the charging dock 1. The holding cavity 10 is a tubular portion whose cross section matches with a cross section of the Bluetooth earset 2, and as shown in FIGS. 1B and 1C, a pair of electric contacts 17 which are adapted to electric contacts 27 at the lower end of the Bluetooth earset 2 are provided on an inner bottom end of the tubular portion. A reference numeral 9 denotes an upper wall of the holding cavity 10. An end of the electric plug 11 and an end of the holding cavity 10 are connected trough a cylinder body 41, and knobs 42 can be provided on both ends of the cylinder body 41. As shown by bidirectional arched arrows in FIG. 1A, the knobs 42 may rotate the cylinder body 41 to such an extent that the electric plug 11 and the holding cavity 10 form an angle with respect to each other so as to suit the use space and facilitate use. The Bluetooth earset 2 has a main body 28, a switch button 23, an indicating lamp 24, a volume button 25, a spare charging hole 26 and a pair of charging electric contacts 27, and also has an earphone neck 21 and an earphone head 22. When the Bluetooth earset is used other than in an automobile, the spare charging hole 26 is used to charge the Bluetooth by means of other power supply device. The earphone neck 21 and the earphone head 22 are connected to a rotating shaft 30 and supported by a supporting rack 29 thereby to be allowed to be rotated. As shown by the bidirectional arched arrows thereby in FIG. 1A, the earphone neck 21 and the earphone head 22 can be rotated outward so as to be inserted into a user's ears when being used and can be rotated back to a position shown in FIG. 1A to be stored. The Bluetooth earset 2 may also be in a form in which it is attached with a fixing clamp (not shown in the figures), as long as the cross section of the holding cavity 10 matches with that of the Bluetooth earset and the Bluetooth earset can be inserted. A chain dotted line in FIG. 1A indicates that when the Bluetooth earset 2 is inserted into the holding cavity 10, the pair of electric contacts 27 contact with the pair of electric contacts 17 and they are energized so that the Bluetooth earset can be charged.

FIGS. 2A to 2C show a second embodiment of the combined apparatus of the Bluetooth earset and the charging dock of the invention. In FIG. 2A, the charging dock 1 in FIG. 1A is changed into a charging dock 1', the electric plug 11 is replaced with a standard type USB (Universal Serial Bus) male port 43 which is connected to a cylinder body 41' through a connecting portion 40, and knobs 42' can be provided at both ends of the cylinder body 41'. Other parts in FIGS. 2A to 2C are similar to those in FIGS. 1A to 1C and designated with the same reference numerals as those shown in the figures mentioned above, and repeated description thereof will be omitted herein. The USB male port 43 is used to be inserted into a USB female port of, for example, a computer (particularly, a notebook computer) and the Bluetooth earset will be charged by means of a power supply of the computer.

Figure 3A:
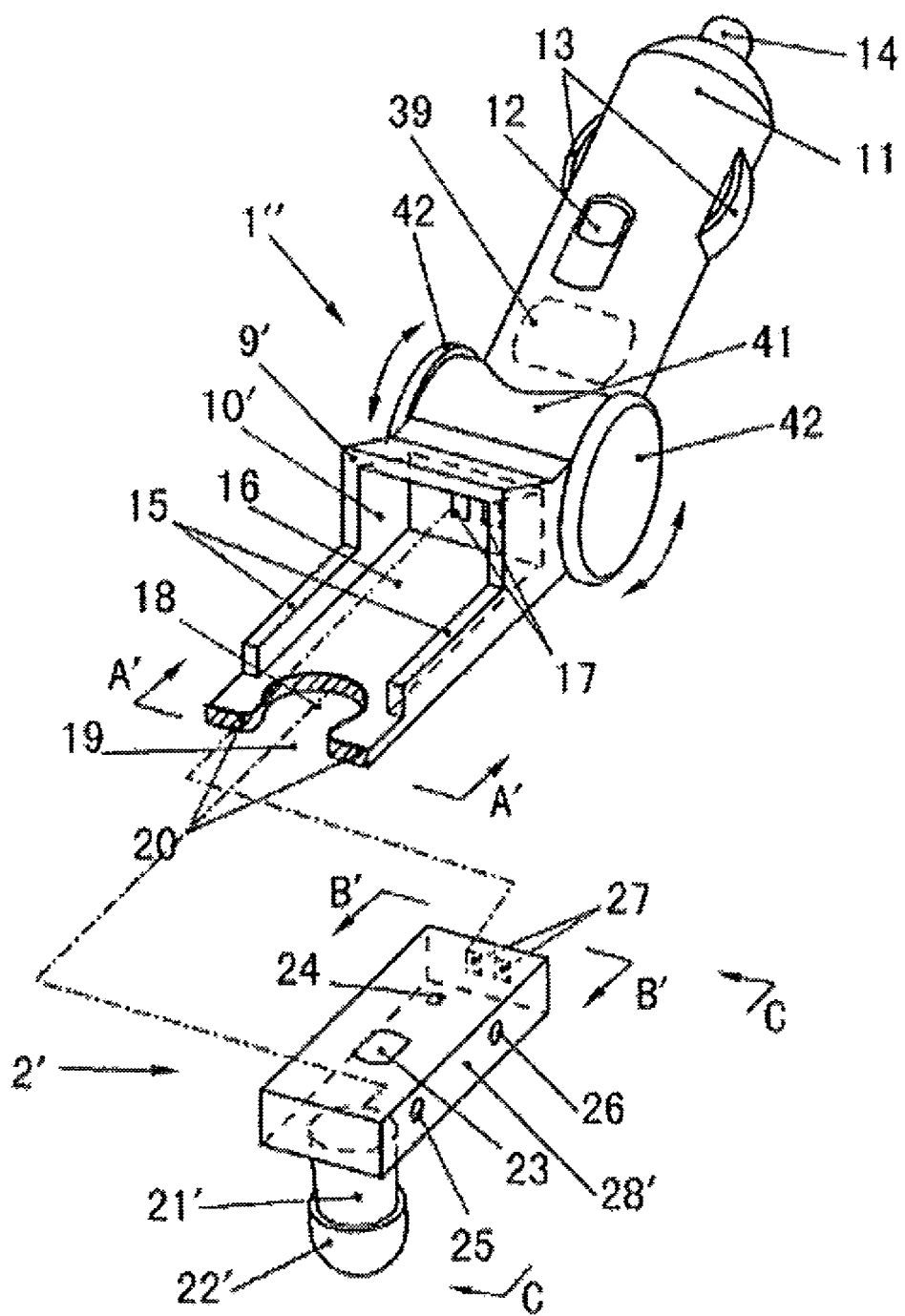
Figure 3B:
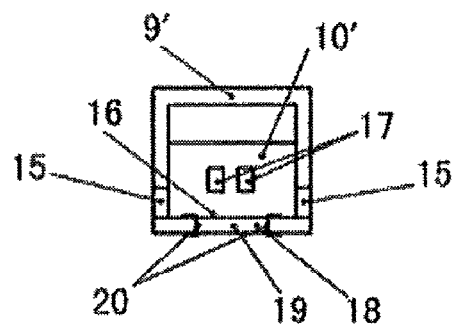
Figure 3C:
Figure 3D:
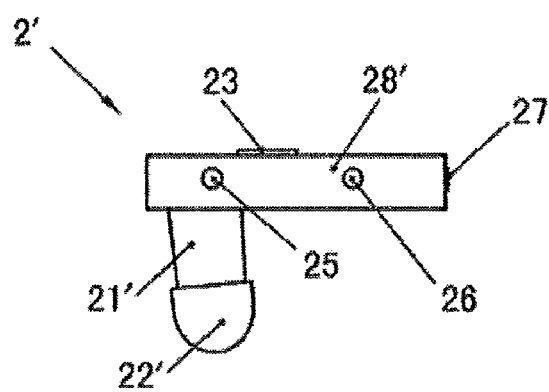

FIGS. 3A to 3D show a third embodiment of the combined apparatus of the Bluetooth earset and the charging dock of the invention. In FIG. 3A, the charging dock 1 in FIG. 1A is changed into a charging dock 1", while the electric plug 11 and the cylinder body 41 are unchanged. An upper wall 9' of a holding cavity 10' is inclined upward to form an elevation angle within a range of 10°~60°, while a base plate of the holding cavity 10 extends outward to become a shallow channel 16. The shallow channel 16 has short side-edges 15, and the shallow channel 16 and the short side-edges 15 assist to hold a main body 28' of the Bluetooth earset 2'. A holding hole 18 and an end opening 19 which are used to receive and hold the earphone neck 21' and the earphone head 22' of the Bluetooth earset 2' are formed on an outer end of the shallow channel 16. The Bluetooth earset 2' in the third embodiment is different from those in the first and second embodiments in that the earphone neck 21' and the earphone head 22' in the third embodiment are fixed and nonrotatable, and an axis of the earphone neck 21' and the earphone head 22' and that of the main body 28' form an angle within a range of 60°~90° to match the shapes of a user's ears and face. Soft material (e.g. foam rubber) 20 is fitted at edges of the holding hole 18 and the end opening 19, and the earphone neck 21' is held by use of elasticity of the soft material 20. Other parts in FIGS. 3A to 3D are designated with the same reference numerals as those shown in the figures mentioned above. Two chain dotted lines in FIG. 3A indicates that when the Bluetooth earset 2' is inserted into the holding cavity 10', the pair of electric contacts 27 contact with the pair of electric contacts 17 and they are energized so that the Bluetooth earset can be charged. Meanwhile, the earphone neck 21' is held into the holding hole 18 and fixed.

Figure 4A:
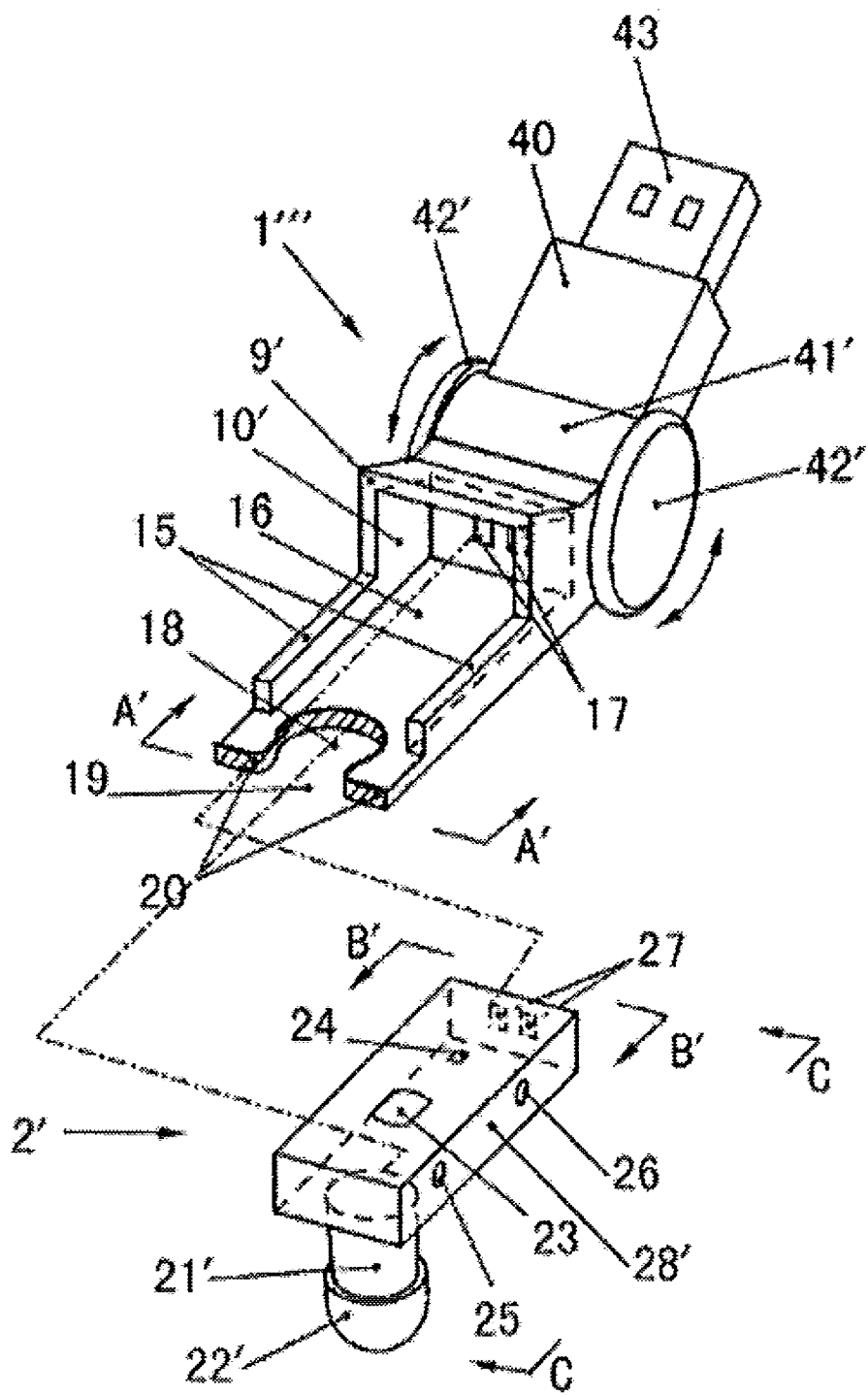
Figure 4B:
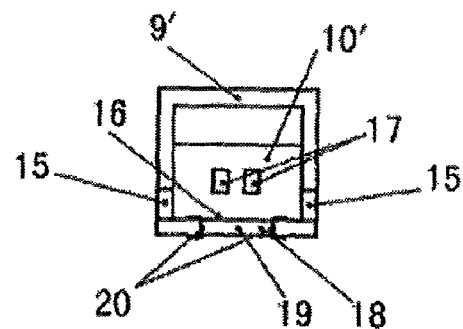
Figure 4C:
Figure 4D:
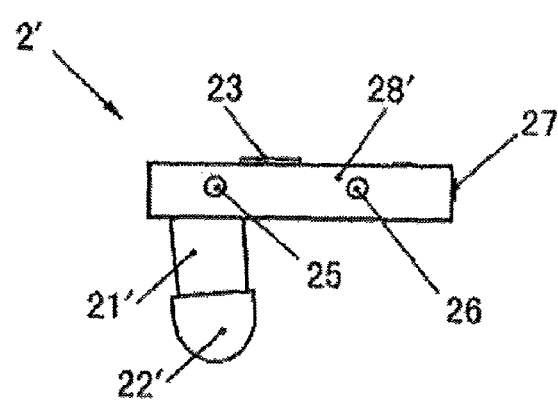

FIGS. 4A to 4D show a fourth embodiment of the combined apparatus of the Bluetooth earset and the charging dock of the invention. In FIG. 4A, the charging dock 1" in FIG. 3A is changed into a charging dock 1'". The fourth embodiment is merely different from the third embodiment in that the electric plug 11 in the third embodiment is replaced with the standard type USB male port 43 so as to charge the Bluetooth earset 2' through a computer (particularly, a notebook computer). Other parts in FIGS. 4A to 4D are designated with the same reference numerals as those shown in the figures mentioned above.

Figure 5A:
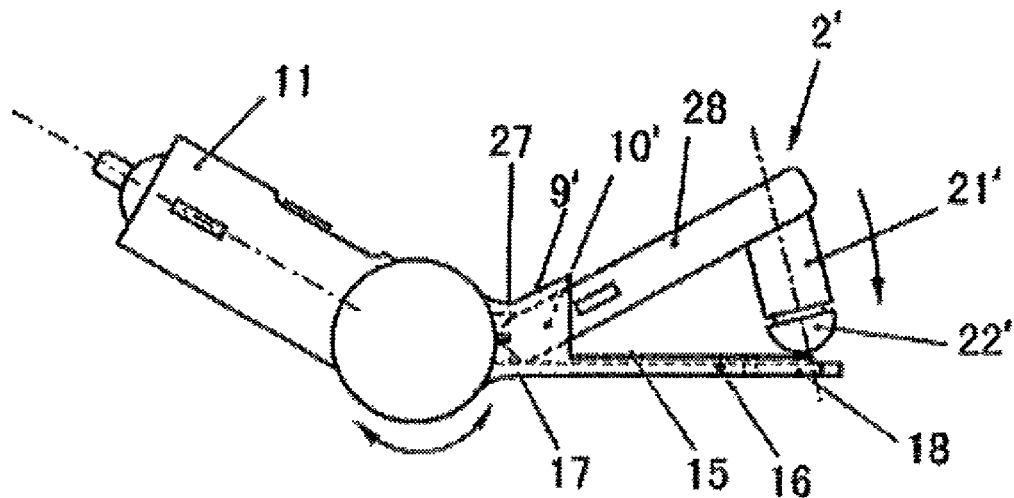
Figure 5B:
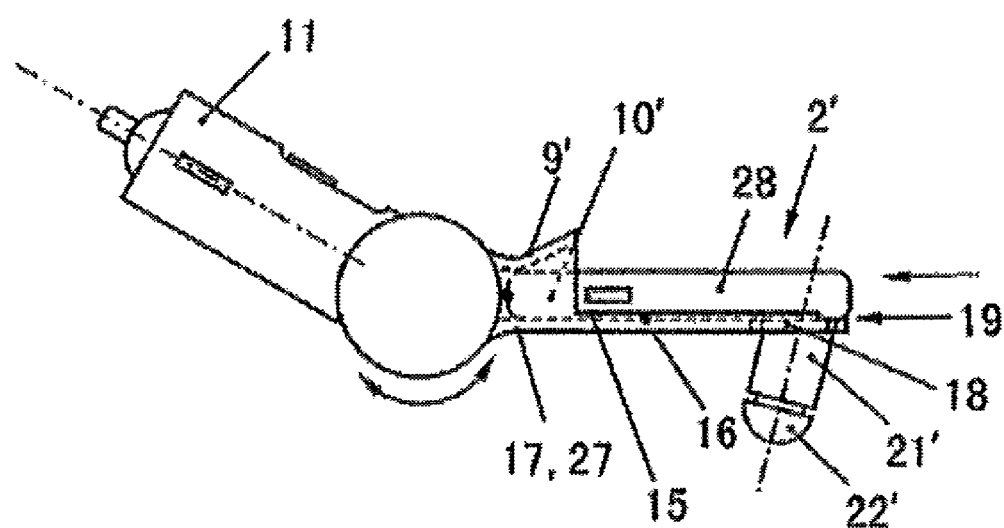

FIGS. 5A and 5B show two use modes of the combined apparatus of the third embodiment. FIG. 5A shows that an edge of the Bluetooth earset 2' is inserted obliquely along the upper wall 9', and then the Bluetooth earset 2' is pushed downward as shown by an arched arrow in FIG. 5A so that the earphone head 22' and the earphone neck 21' enter into the holding hole 18 and are held. Alternatively, as shown by an arrow directed horizontally and located in a right portion of FIG. 5B, the earphone neck 21' of the Bluetooth earset 2' may also cross over the end opening 19 and enter into the holding hole 18. Both of the two modes mentioned above can attain the object that the electric contacts 17 contact with the electric contacts 27 to perform charging. Other parts in FIGS. 5A and 5B are designated with the same reference numerals as those shown in the figures mentioned above.

In the case of the fourth embodiment, the inserting procedure is similar to that shown in FIGS. 5A and 5B, but the only difference is that the electric plug 11 in a left portion of FIGS. 5A and 5B is replaced with the USB male port 43, and the illustration in this regard is omitted.

Figure 6A:
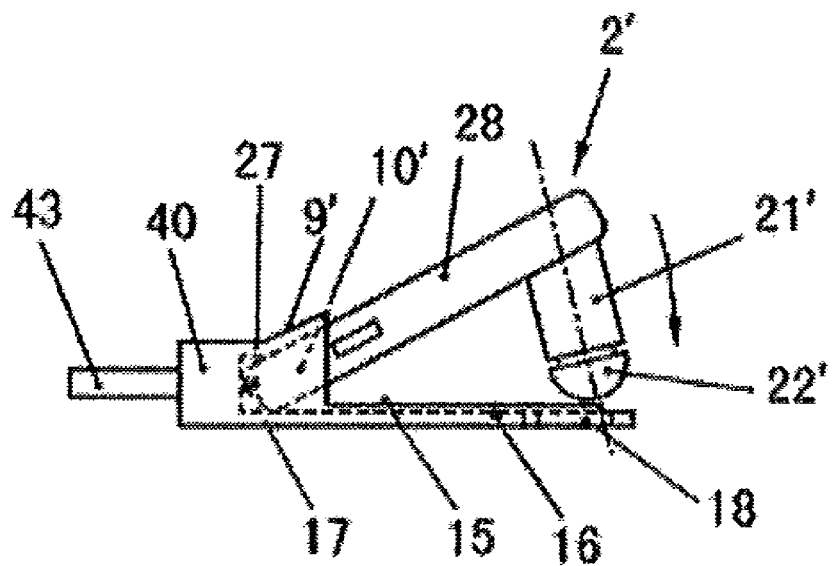
Figure 6B:
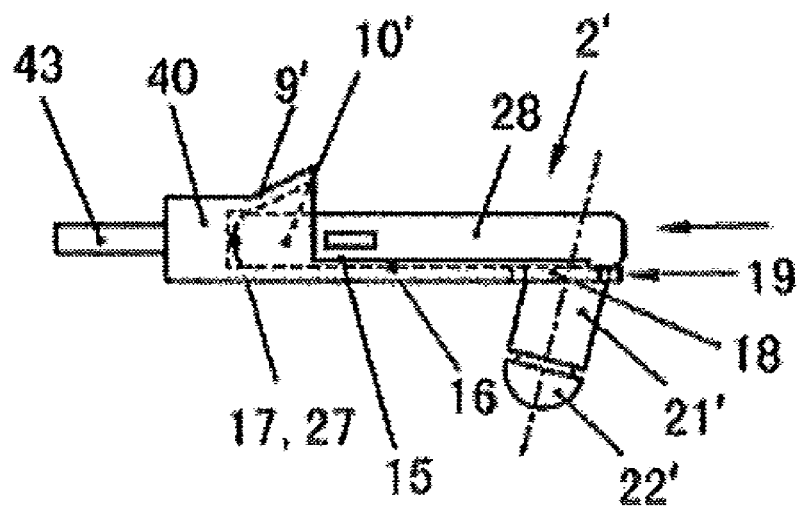

FIGS. 6A and 6B show a fifth embodiment of the combined apparatus of the Bluetooth earset and the charging dock of the invention. As shown in FIGS. 6A and 6B, an electrical connection portion (the standard type USB male port 43 is exemplified in the figures) and a holding cavity portion are connected into an entirety directly without the cylinder body and the knobs provided therebetween. In use, the electrical connection portion or the holding cavity portion does not need to be rotated by an angle. As a result, the product thus made is simple in structure, small in size and low in cost. The two portions shown in the figures are directly connected to each other on the same axis. Needless to say, in manufacture, the electrical connection portion and the holding cavity portion can also be fabricated so that they form an angle within a range of 90°~180° each other (not shown in the figures) to facilitate the user's insertion and pulling out. Use modes of the combined apparatus are similar to those described with reference to FIGS. 5A and 5B, and other parts in FIGS. 6A and 6B are designated with the same reference numerals as those shown in the figures mentioned above. In a similar way, if the USB male port is replaced with the above-mentioned electric plug 11 which is used to be connected to an automobile's 12V or 24V DC power supply, a sixth embodiment of the combined apparatus of the Bluetooth earset and the charging dock of the invention will be established.

Figures 7A, 8A:
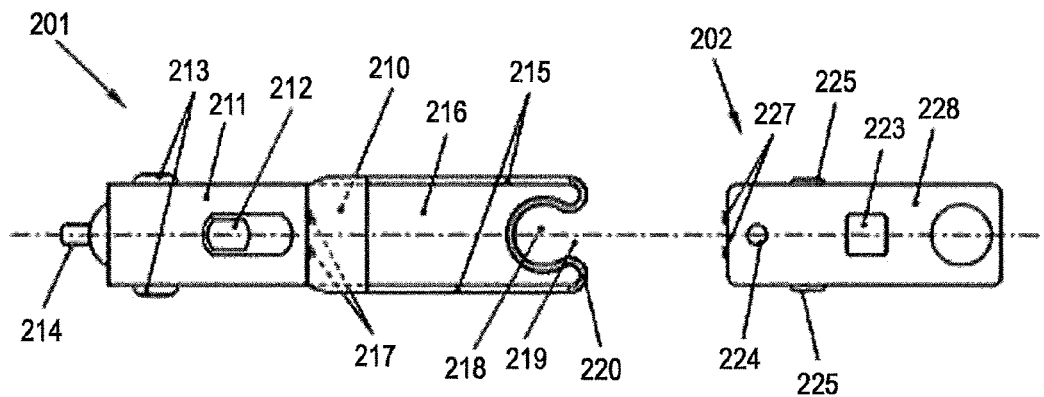
Figures 7B, 8B:
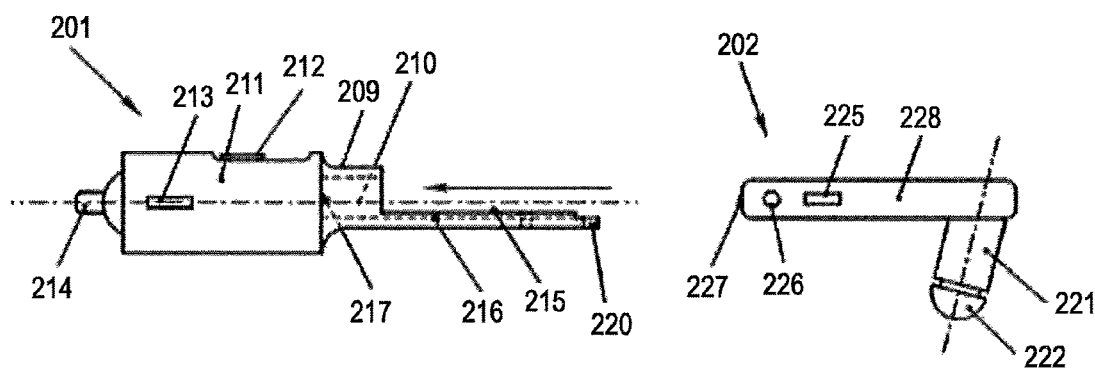

FIGS. 7A and 7B show the charging dock 201 of the combined apparatus of the Bluetooth earset and the charging dock according to a seventh embodiment of the present invention. In FIGS. 7A and 7B, a reference numeral 211 denotes an electric plug portion of the charging dock of the seventh embodiment. The electric plug portion 211 is provided with negative poles 213 and a positive pole 214 which can be connected to a DC electric socket in the automobile, as well as an electric switch 212, and a converting device (not shown in the figures) which is used to convert a 12V or 24V DC power supply into a power supply suitable for charging the earset is built in the electric plug portion 211. A reference numeral 216 denotes a shallow channel which is planar approximately, and short side-edges 215 are provided on both sides of the shallow channel 216. A holding cavity 210 for inserting and fixing a bottom end of a Bluetooth earset 202 is provided near to the electric plug portion 211. The holding cavity 210 has an upper wall 209 which is substantially parallel to a bottom surface of the shallow channel 216. Electric contacts 217 for charging the Bluetooth earset after power supply conversion are provided on the innermost bottom surface of the holding cavity 210. A holding hole 218 for holding and fixing an earphone neck 221 of the earset is provided on the outermost end (the rightmost end in FIG. 7A) of the shallow channel 216. An end opening 219 through which the earphone neck 221 of the earset passes to be positioned in the holding hole 218 is provided on the outermost end of the holding hole 218. A fitted edge 220 made of a layer of soft material (e.g. foam rubber or other soft material) is fitted at edges of the holding hole 218 and the end opening 219, and the earphone neck 221 can be squeezed through the end opening 219 to be fixed in the holding hole 218 by virtue of elasticity of the fitted edge 220. It can also be seen from FIG. 7B that the upper wall 209 of the holding cavity 210 is substantially parallel to the bottom surface of the shallow channel 216.

FIGS. 8A and 8B are a top view and a front view of the Bluetooth earset 202 of the seventh embodiment respectively. A reference numeral 228 denotes a main body of the Bluetooth earset 202, and in addition to this, the Bluetooth earset 202 also has an earphone head 222, the earphone neck 221, a switch button 223, an indicating lamp 224, a volume button 225 and a spare charging hole 226. When the Bluetooth earset is used other than in the automobile, a device (not shown in the figures) which converts a 100V~240V AC power supply into a power supply suitable for charging the earset can be used to perform charging. A reference numeral 227 denotes charging electric contacts, and when the Bluetooth earset is held on the charging dock 201 shown in FIGS. 7A and 7B, the charging electric contacts 227 are connected to the electric contacts 217 to perform charging.

Figure 9:
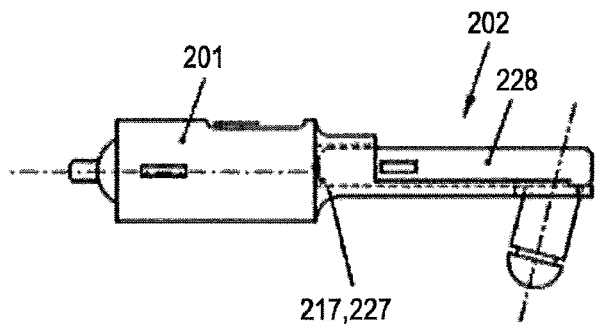
FIG. 9 is a schematic diagram showing that the Bluetooth earset is fixed on the charging dock in the seventh embodiment of the combined apparatus of the Bluetooth earset and the charging dock of the invention.

In FIG. 9, at first, the main body 228 of the Bluetooth earset 202 which is in a posture shown in FIG. 8B is laid on the shallow channel 216 shown in FIG. 7B and held between the two short side-edges 215, then the Bluetooth earset 202 is pushed inward in a direction of a long arrow so that a bottom end of the earset 202 enters the holding cavity 210 and reaches the bottom of the holding cavity 210 and is fixed. Meanwhile, the earphone neck 221 of the earset 202 is squeezed into the holding hole 218 through the end opening 219 and is fixed thereon, and the electric contacts 227 are electrically connected to the electric contacts 217 and it is ready for the earset to be charged.

Figure 10A:
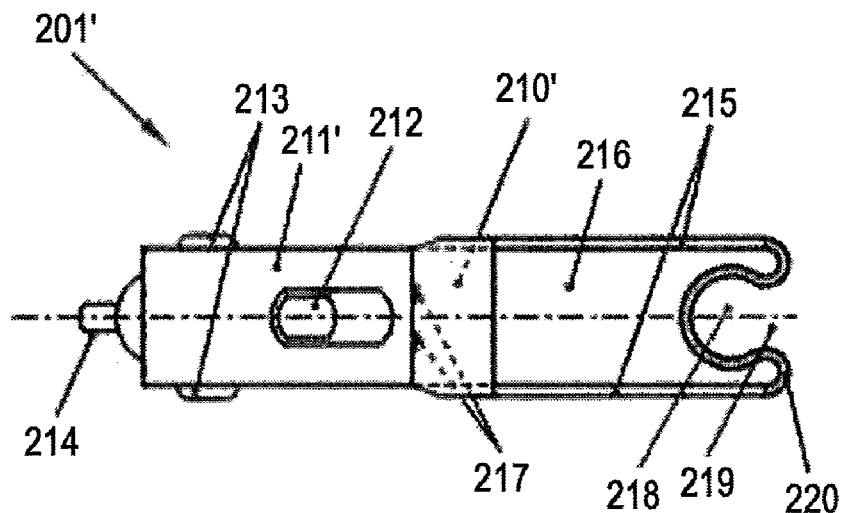
Figure 10B:
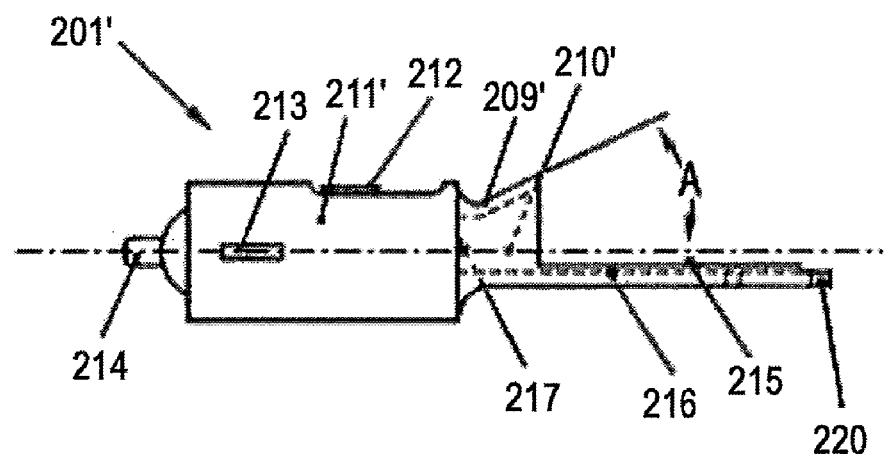

FIGS. 10A and 10B show the charging dock of the combined apparatus of the Bluetooth earset and the charging dock according to an eighth embodiment of the invention. In this embodiment, the charging dock is denoted by a reference numeral 201' and the Bluetooth earset is same as that shown in FIGS. 8A and 8B of the seventh embodiment.

The eighth embodiment is different from the seventh embodiment in that the electric plug portion 211 is changed into an electric plug portion 211', the holding cavity 210 is changed into a holding cavity 210', and the upper wall 209 of the holding cavity is changed into an upper wall 209'. It can be seen from FIG. 10B that the upper wall 209' is not parallel to the plane of the shallow channel 216 but has an oblique angle A which is within a range of 10°~60° generally, and is preferably about 40°. Other parts in FIGS. 10A and 10B are designated with the same reference numerals as those shown in the figures mentioned above.

Figure 11A:
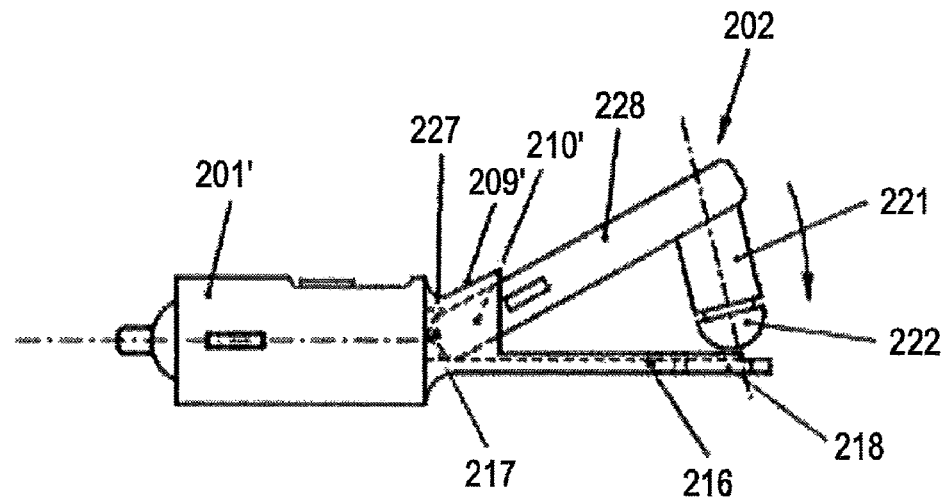
Figure 11B:
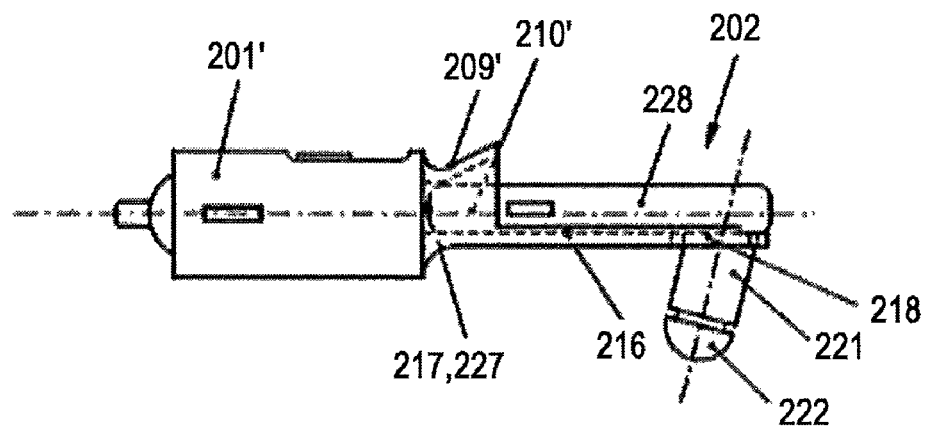

In addition to the manner shown in FIG. 9, the Bluetooth earset 202 and the charging dock 201' can be combined together in two steps as shown in FIGS. 11A and 11B: firstly, as shown in FIG. 11A, the bottom end of the Bluetooth earset 202 is inserted into the bottom of the holding cavity 210' obliquely along the upper wall 209' (at this time, since the upper wall 209' has an oblique angle, the earphone head 222 of the earset does not come into contact with the shallow channel 216), then the Bluetooth earset is pushed downward as shown by an arched arrow in FIG. 11A so that the earphone head 222 passes through the holding hole 218 and the earphone neck 221 is held in the holding hole 218 exactly, at the same time, the main body 228 of the earset is seated in the shallow channel 216 and held. Thus, the electric contacts 227 are connected to the electric contacts 217 as well for charging.

Figure 12A:
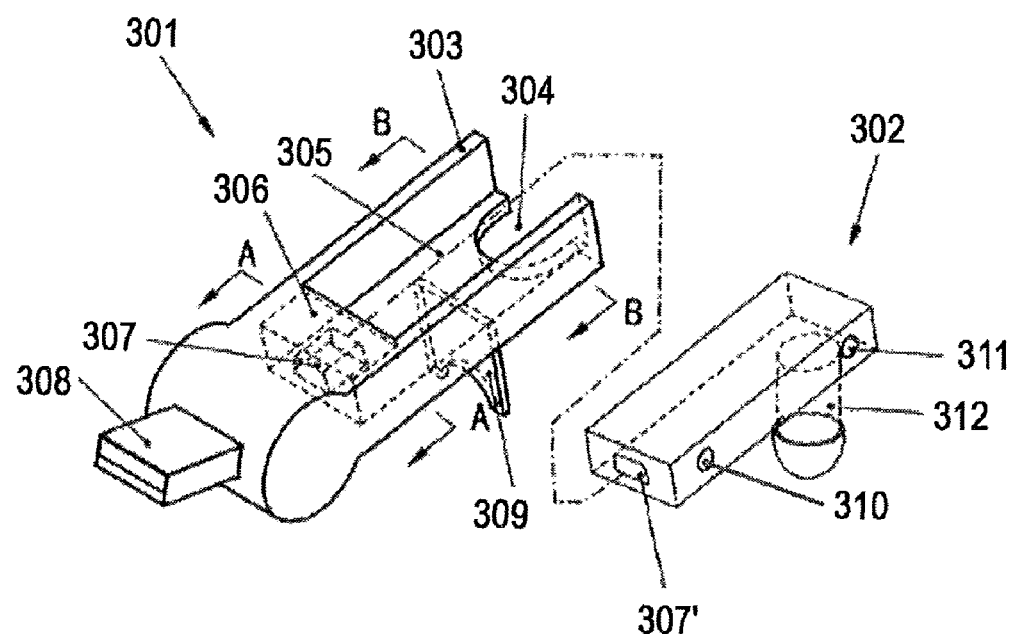
Figures 12B, 12C:
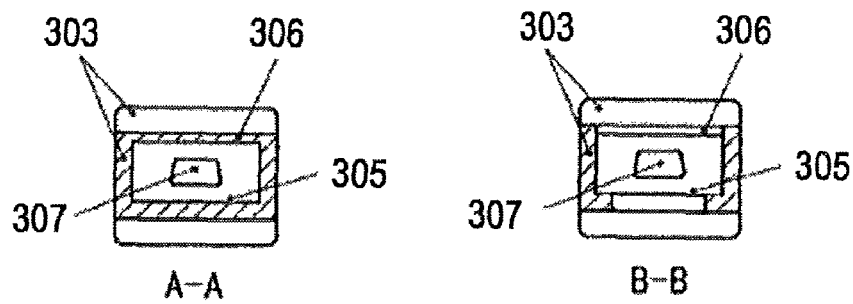

FIGS. 12A to 12C show a ninth embodiment of the combined apparatus of the Bluetooth earset and the charging dock of the invention. The left portion of FIG. 12A shows a charging dock 301, and the right portion thereof shows a Bluetooth earset 302. A main body 303 of the charging dock 301 has a holding cavity portion capable of receiving the Bluetooth earset 302, and a base plate 305 of the holding cavity portion is shallow U-shaped and extends outward. An end opening 304 for holding an earphone 312 is provided on an upper end of the base plate 305, and a cover plate 306 for overlaying a lower portion of the Bluetooth earset 2 is provided on the holding cavity portion. A mini USB male port 307 is provided on the bottom of the holding cavity portion. A lower end of the charging dock 301 is expanded to contain conducting wires and electronic devices required, meanwhile, a protruding standard type USB male port 308 is connected to the lower end. When the USB male port 308 is disposed horizontally, the main body 303 of the charging dock is tilted upward with an elevation angle which may be in a range of 5°~45°. Meanwhile, a supporting rack 309 which can be pulled out or pushed back is provided under the main body of the charging dock. As shown in FIG. 12C, a mini USB female port 307' is provided on a lower end of the Bluetooth earset 302.

In use, the Bluetooth earset 302 is put in the base plate 305 of the holding cavity portion from an upper end of the charging dock 301 and slides downward as shown by a chain dotted line in FIG. 12A so that the mini USB female port 307' on the bottom of the Bluetooth earset 302 is connected to the mini USB male port 307 on the bottom of the base plate 305 while the earphone 312 is held in the end opening 304. Then, the whole combined apparatus is connected to a standard type USB female port of, for example, a computer by means of the standard type USB male port 308 on the bottom end with such an aim that (1) a battery in the Bluetooth earset is charged with the computer as a power supply; and (2) the computer is in communication with the Bluetooth earset.

A spare charging hole 310 is also provided on the Bluetooth earset 302, and when a computer is not available, the battery of the Bluetooth earset can be charged by a power supply obtained by transforming and rectifying a 100V~240V AC power supply in house through the spare charging hole. A reference numeral 311 denotes an additional earphone hole, and the user can insert a stereo earphone for listening to music into the earphone hole. A switch button, an indicating lamp and operation buttons and the like (not shown in the figures) which are necessary should be provided on the Bluetooth earset 301.

A USB data storage (not shown in the figures) may also be provided in the charging dock 301, for example, in an expanded portion in the lower portion of the charging dock 301, so as to be in communication with the computer connected to the USB data storage. When necessary, operation buttons (not shown in the figures) can be provided on a surface of the charging dock.

Many alternatives can be derived from the embodiment. For example, a clamping mouth with elasticity can be formed in an outer opening portion of the end opening 304, and the earphone 312 can be squeezed through the clamping mouth and be fixed. For example, a cross section of the base plate 305 of the holding cavity may also be in another shape, but it should match with the cross section of the Bluetooth earset 302. Again, for example, a lower end portion of the main body 303 of the charging dock 301 may also has another outer shape, and so on (these alternatives not shown in the figures).

Figure 13:
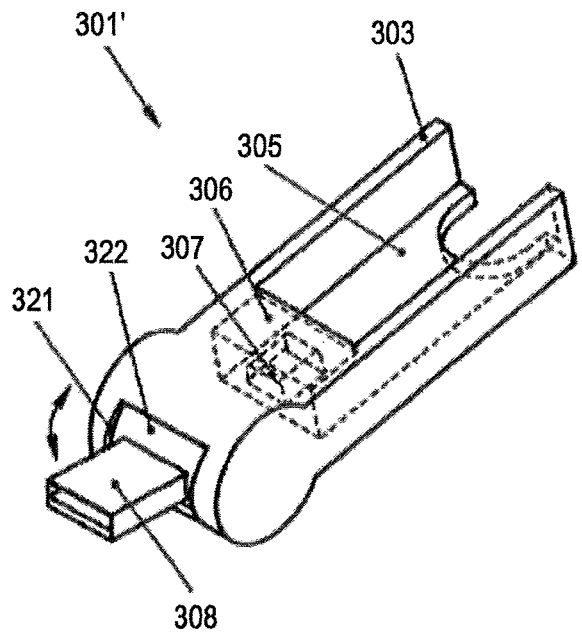
FIG. 13 is a schematic diagram showing the charging dock of the combined apparatus of the Bluetooth earset and the charging dock according to a tenth embodiment of the invention.

FIG. 13 shows the charging dock of the combined apparatus of the Bluetooth earset and the charging dock according to a tenth embodiment of the invention. An expanded portion on a lower end of a charging dock 301' is fabricated into a cylindrical portion whose axis is perpendicular to an axis of the charging dock 301', and a window 321 is opened on a lower end of the cylindrical portion. A cylindrical inner core 322 is provided in the cylindrical portion, and the standard type USB male port 308 is connected to the inner core 322 and protrudes outside the window 321. Thus, an orientation of the USB male port 308 can be rotated around the axis of the expanded portion of the charging dock 301' as shown by a bidirectional arched arrow in the figure thereby to be regulated to an appropriate angle so as to match a space in the vicinity of the USB female port of the computer to be connected to the USB male port 308. Other parts in the figure are designated with the same reference numerals as those shown in the figures mentioned above.

Many alternatives can also be derived from the embodiment based on the same principle. For example, in the embodiment, the window is opened on a housing of the expanded portion on the lower end of the charging dock 301', and the inner core inside the expanded portion is rotatable. The embodiment can be modified so that the inner core is connected to the main body 303 and the housing is rotatable. Further, one or both ends of the rotatable inner core may be exposed outside the housing, or the exposed portion may be fabricated into a knob shape, and so on (these alternatives not shown in the figure).

Figure 14A:
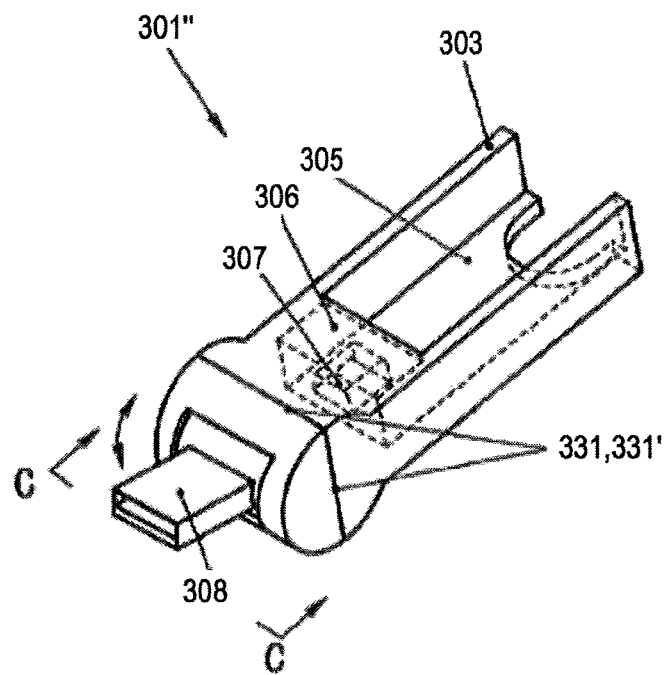
Figure 14B:
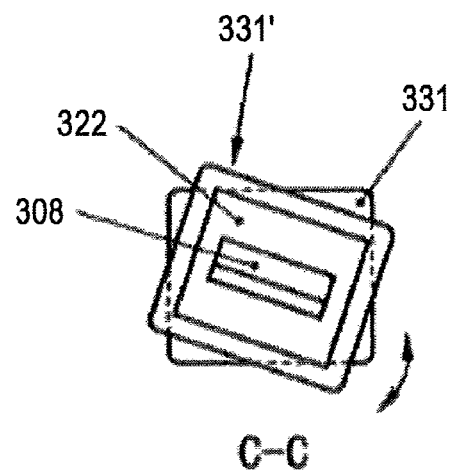

FIGS. 14A and 14B show the charging dock of the combined apparatus of the Bluetooth earset and the charging dock according to an eleventh embodiment of the invention. As shown in FIG. 14A, a pair of discontinuous surfaces 331 and 331' which are perpendicular to a longitudinal axis of a charging dock 301" are further provided in the expanded portion on the lower end of the charging dock 301", and the two surfaces 331 and 331' are discontinuous but kept contact with each other. A rotating axle is provided on one of the surfaces, and an axle-bearing cavity which cooperates with the rotating axle is provided in the other (neither is shown in the figures). Thus, the surface 331 and the surface 331' can be rotated with respect to each other as shown by a bidirectional arched arrow in FIG. 14B. Generally, a position limiting (or angle limiting) mechanism (not shown in the figures) such as a mechanism which defines a rotation angle of 90° should be provided on the surfaces 331 and 331'. In this way, the USB male port 308 which protrudes from the window 321 can be rotated to accommodate to the space in the vicinity of the USB female port of the computer. Other parts in FIG. 14A are designated with the same reference numerals as those shown in the figures mentioned above.

FIG. 14B is a C-C direction view of a bottom end of the charging dock in FIG. 14A, indicating that the discontinuous surfaces 331 and 331' are kept contact with each other and can be rotated with respect to each other as shown by the bidirectional arched arrow in the figure. Other parts in FIG. 14B are designated with the same reference numerals as those shown in the figures mentioned above.

Other alternatives can also be derived from the embodiment base on the same principle. For example, a cross section of the expanded portion on the lower end of the charging dock 301" can be fabricated into a circular shape, or a filleted square shape or the like (not shown in the figures) to facilitate rotation and close fitting of the discontinuous surfaces.

Figure 15:
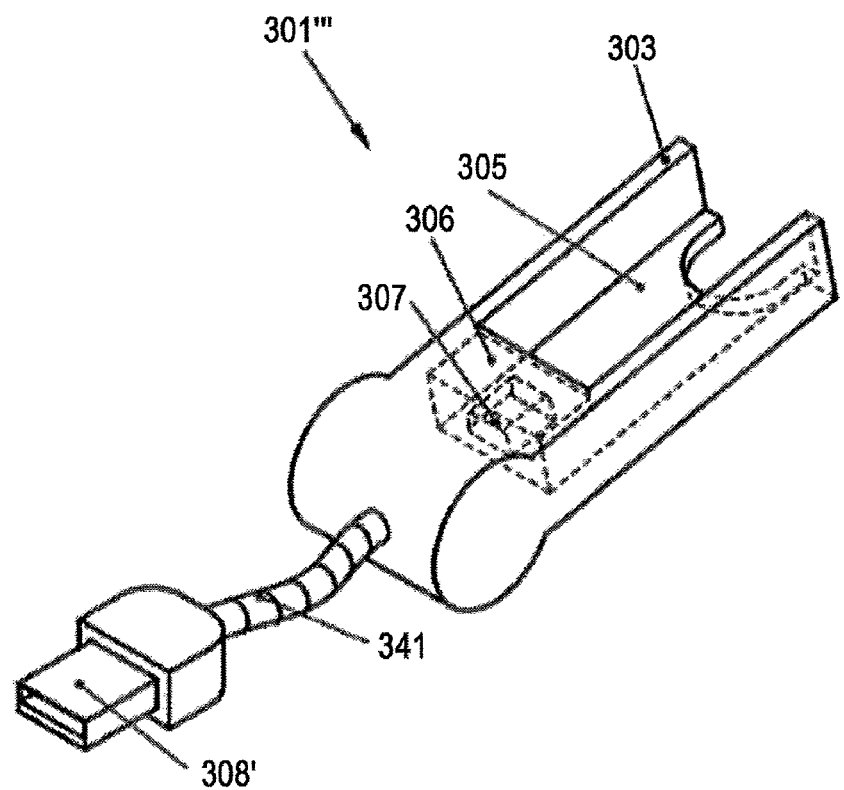
FIG. 15 is a schematic diagram showing the charging dock of the combined apparatus of the Bluetooth earset and the charging dock according to a twelfth embodiment of the present invention.

FIG. 15 shows the charging dock of the combined apparatus of the Bluetooth earset and the charging dock according to a twelfth embodiment of the present invention. In FIG. 15, a standard type USB male port 308' is not directly connected to a lower end of the charging dock 301'''. A piece of corrugated flexible tube 341 (i.e. a tube which is composed of a helical sheath, is flexible and has a certain rigidity) through which the conducting wires pass is led out from the lower end of the charging dock 301''', and the other end of the corrugated flexible tube is connected to the standard type USB male port 308'. Thus, when the charging dock 301''' is connected to the computer, the charging dock 301''' will be inserted and fixed in a position conveniently, irrespective of an orientation of the standard type USB female port of the computer and how narrow the space therearound is. Other parts in FIG. 15 are designated with the same reference numerals as those shown in the figures mentioned above.

In the ninth to twelfth embodiments of the combined apparatus of the Bluetooth earset and the charging dock of the invention, a pair of electro-conducting contacts (similar to those in the first to eighth embodiments and not shown in the figures) are used on the bottom of the Bluetooth earset 302 in place of the mini USB female port 307', and a pair of electro-conducting contacts (not shown in the figures) which correspond to the above-mentioned pair of electro-conducting contacts are used on the bottom of the holding cavity portion in place of the mini USB male port 307. At this time, the function of the whole apparatus is reduced to only charge the battery in the Bluetooth earset 302 with the 12V or 24V DC power supply in the automobile as a power supply.

While the exemplary embodiments of the invention have been described in detail with reference to the drawings, the invention is not restricted to the above specific embodiments. It is apparent for those skilled in the art to make various changes and modifications to the invention without departing from the spirit and scope of the invention. The scope of the invention is defined by the following claims and equivalents thereof.

What is claimed is:

1. A combined apparatus of a Bluetooth earset and a charging dock, the combined apparatus comprising the Bluetooth earset and the charging dock which can be connected to a power supply, the charging dock comprising a main body portion,
wherein an electrical connection portion which can be connected to a DC power supply is formed at one end of the main body portion of the charging dock, and a holding cavity portion for fixing the Bluetooth earset is formed at the other end of the main body portion, and the holding cavity portion has an outer shape and a size which match with those of the Bluetooth earset,
wherein one end of the holding cavity portion in a longitudinal axis along which the Bluetooth earset is inserted in or pulled out is a holding cavity which is enclosed and has holding walls, the one end is provided with electric contacts which are adapted to electric contacts at a bottom end of the Bluetooth earset, and the other end of the holding cavity portion in the longitudinal axis is opened outward, and
wherein the electrical connection portion of the main body portion of the charging dock is connected to a lower portion of the main body portion of the charging dock through a piece of corrugated flexible tube which is flexible and has a certain rigidity.

2. A combined apparatus of a Bluetooth earset and a charging dock, the combined apparatus comprising the Bluetooth earset and the charging dock which can be connected to a power supply, the charging dock comprising a main body portion,
  wherein an electrical connection portion which can be connected to a DC power supply is formed at one end of the main body portion of the charging dock, and a holding cavity portion for fixing the Bluetooth earset is formed at the other end of the main body portion, and the holding cavity portion has an outer shape and a size which match with those of the Bluetooth earset,
  wherein one end of the holding cavity portion in a longitudinal axis along which the Bluetooth earset is inserted in or pulled out is a holding cavity which is enclosed and has holding walls, the one end is provided with electric contacts which are adapted to electric contacts at a bottom end of the Bluetooth earset, and the other end of the holding cavity portion in the longitudinal axis is opened outward, and
  wherein the electrical connection portion and the holding cavity portion are directly connected into an integral unit, and a longitudinal axis of the electrical connection portion and that of the holding cavity portion form a fixed angle within a range of 90°~180° of each other.

3. A combined apparatus of a Bluetooth earset and a charging dock, the combined apparatus comprising the Bluetooth earset and the charging dock which can be connected to a power supply, the charging dock comprising a main body portion,
  wherein an electrical connection portion which can be connected to a DC power supply is formed at one end of the main body portion of the charging dock, and a holding cavity portion for fixing the Bluetooth earset is formed at the other end of the main body portion, and the holding cavity portion has an outer shape and a size which match with those of the Bluetooth earset,
  wherein one end of the holding cavity portion in a longitudinal axis along which the Bluetooth earset is inserted in or pulled out is a holding cavity which is enclosed and has holding walls, the one end is provided with electric contacts which are adapted to electric contacts at a bottom end of the Bluetooth earset, and the other end of the holding cavity portion in the longitudinal axis is opened outward, and
  wherein a device which can be rotated to change an angle formed by the longitudinal axis of the electrical connection portion and that of the holding cavity portion is provided between the electrical connection portion and the holding cavity portion.

4. The combined apparatus of the Bluetooth earset and the charging dock according to any one of claims 1, 2 and 3, wherein the electrical connection portion is an electric plug which can be connected to an automobile's 12V or 24V DC electric socket, and
  wherein a converting device which converts a 12V or 24V DC power supply into a power supply suitable for charging the Bluetooth earset is provided in the electric plug.

5. The combined apparatus of the Bluetooth earset and the charging dock according to any one of claims 1, 2 and 3, wherein the electrical connection portion is a standard type USB male port.

6. The combined apparatus of the Bluetooth earset and the charging dock according to claim 5, wherein a USB data storage which can be in communication with a computer is provided in the main body portion of the charging dock, and a supporting rack which can be pulled out or pushed back is provided under the main body portion of the charging dock.

7. The combined apparatus of the Bluetooth earset and the charging dock according to claim 5, wherein a window in which an inner core is fitted is formed on a lower end of the main body portion of the charging dock, and the inner core can be rotated around a rotating axis perpendicular to a longitudinal axis of the main body portion of the charging dock, and the standard type USB male port of the electrical connection portion of the main body portion of the charging dock is connected to the inner core and protrudes outside the window.

8. The combined apparatus of the Bluetooth earset and the charging dock according to claim 5, wherein two discontinuous surfaces which are perpendicular to the longitudinal axis of the main body portion are provided in the lower end portion of the main body portion of the charging dock, a rotating axle is provided on one of the discontinuous surfaces, an axle-bearing cavity which cooperates with the rotating axle is provided on the other of the discontinuous surfaces, and the two discontinuous surfaces are kept in contact with each other and can be rotated with respect to each other within an angle range of 0°-90°.

9. The combined apparatus of the Bluetooth earset and the charging dock according to any one of claims 1, 2 and 3, wherein the Bluetooth earset includes an earphone portion which includes an earphone neck and an earphone head, the earphone neck and the earphone head are fixed with respect to the main body portion of the Bluetooth earset, and an axis of the earphone neck and the earphone head forms an angle of 60°~90° with respect to an axis of the main body portion of the Bluetooth earset.

10. The combined apparatus of the Bluetooth earset and the charging dock according to claim 9, wherein the holding cavity portion of the main body portion of the charging dock has a base plate which is in a shape of a shallow channel and extends outward from a lower wall of the holding walls, and the base plate has short side-edges and a holding hole and an end opening for receiving and fixing the earphone neck are formed on an outer end of the base plate.

11. The combined apparatus of the Bluetooth earset and the charging dock according to any one of claims 1, 2 and 3, wherein the Bluetooth earset includes an earphone portion which includes an earphone neck and an earphone head, a rotating cylinder is provided at an end of the Bluetooth earset where the earphone portion is disposed, and the rotating cylinder causes the earphone neck and the earphone head to be rotated and change their state from a store position where their axis is in the same direction with an axis of the main body portion of the Bluetooth earset to a using position where their axis is approximately perpendicular to the axis of the main body portion of the Bluetooth earset.

12. The combined apparatus of the Bluetooth earset and the charging dock according to claim 11, wherein the holding cavity portion of the main body portion of the charging dock has a base plate which is in a shape of a shallow channel and extends outward from a lower wall of the holding walls, and the base plate has short side-edges and a holding hole and an end opening for receiving and fixing the earphone neck are formed on an outer end of the base plate.

13. The combined apparatus of the Bluetooth earset and the charging dock according to any one of claims 1, 2 and 3, wherein the electric contacts on the bottom end of the Bluetooth earset are a mini USB female port, and the electric contacts in the holding cavity portion are a mini USB male port.

14. The combined apparatus of the Bluetooth earset and the charging dock according to any one of claims 1, 2 and 3, wherein an upper wall of the holding walls of the holding cavity portion is substantially parallel to a lower wall of the holding walls and a base plate which is in a shape of a shallow groove and extends outward of the holding cavity portion.

15. The combined apparatus of the Bluetooth earset and the charging dock according to any one of claims 1, 2 and 3, wherein a lower wall of the holding walls of the holding cavity portion has a base plate which is in a shape of a shallow groove and extends outward, and wherein an upper wall of the holding walls of the holding cavity portion is inclined upward with an elevation angle within a range of 10°~60°.

16. The combined apparatus of the Bluetooth earset and the charging dock according to any one of claims 1, 2 and 3, wherein a rotation position limiting mechanism is provided at a lower portion of the main body portion of the charging dock.

17. The combined apparatus of the Bluetooth earset and the charging dock according to any one of claims 1, 2 and 3, wherein a plugging-in hole which can be connected to a power supply obtained by transforming and rectifying a 100V~240V AC power supply is provided on the Bluetooth earset, and a plugging-in hole which can be connected to an external stereo earphone is provided on the Bluetooth earset.

* * * * *

UNITED STATES PATENT AND TRADEMARK OFFICE
CERTIFICATE OF CORRECTION

PATENT NO. : 8,369,902 B2  
APPLICATION NO. : 12/599207  
DATED : February 5, 2013  
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 590 days.

Signed and Sealed this

First Day of September, 2015

Michelle K. Lee
*Director of the United States Patent and Trademark Office*